Jan. 16, 1968  P. WILLEMS  3,363,731
HYDRODYNAMIC TORQUE TRANSMISSION DEVICE
Filed Oct. 23, 1965  2 Sheets-Sheet 1

INVENTOR
PETER WILLEMS
BY
ATTORNEY.

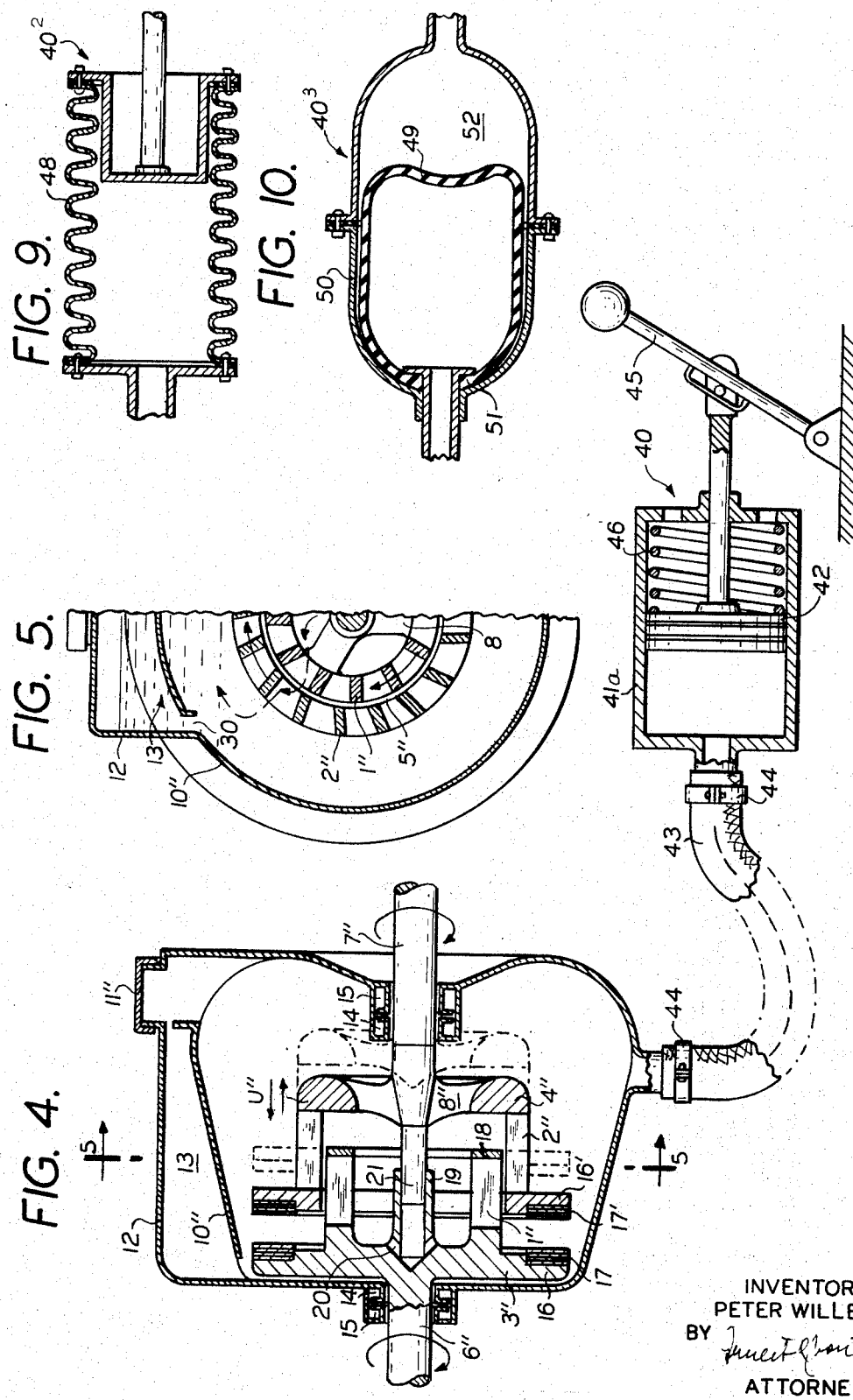

United States Patent Office 3,363,731
Patented Jan. 16, 1968

3,363,731
HYDRODYNAMIC TORQUE TRANSMISSION DEVICE
Peter Willems, Steinhofhalde 20–22, Lucerne, Switzerland
Filed Oct. 23, 1965, Ser. No. 503,313
Claims priority, application Switzerland, Oct. 26, 1964, 13,860/64
12 Claims. (Cl. 192—3.28)

ABSTRACT OF THE DISCLOSURE

A hydrodynamic torque transmission device which comprises a housing and a pump impeller which is disposed in the housing. A drive shaft extends in to the housing and connects operatively with the pump impeller. Furthermore, a turbine impeller is disposed in the housing and a driven shaft is arranged coaxially with the driving shaft and extends into the housing. The pump impeller and the turbine impeller each have at least one ring of radial-admission blades which extend substantially axially. The blade rings are disposed coaxially relative to each other. The housing defines a central chamber and the blade rings rotate about the central chamber. Means are arranged for axially displacing the blade rings relative to each other into a plurality of radially overlapping positions from an idle non-overlapping position with increasing overlapping, a synchronization position and a coupling position. Complementary coupling members are also secured to the blade rings of resiliently yielding in axial direction to be rendered operative in the synchronization position of the blade rings and coupling means are secured to and operative between the blade rings in the coupling position of the blade rings.

---

The present invention relates to a hydrodynamic torque transmission device, consisting of a housing arranged to be at least partly filled with a fluid, and in which are arranged a pump impeller connected to a driving shaft and a turbine impeller connected to a driven shaft.

Devices of this type are known as "hydraulic coupling," "flow couplings" or "Föttinger couplings," and include, generally speaking, a pump impeller, a turbine impeller and a casing connected to both impellers and forming a revolving housing. It is customary for the blade arrangement in the housing to have a core ring.

Many and varied proposals have already been made in an endeavour to find a construction which slips as little as possible when arranged for normal transmission, but which transmits a very low torque to the working shaft when fully blocked, such proposals including for instance a secondary blade ring, a throttle ring, a retractable blade ring, mechanically or hydraulically controlled rapid venting, and revolving slides.

It is an object of the present invention to provide a transmission device which gives little or no slip during normal transmission, but which can be disengaged to provide low torque transmission.

It is another object of the present invention to provide a hydrodynamic torque transmission device, having a housing arrranged to be at least partly filled with a fluid, in which housing are arranged a pump impeller connected to a drive shaft and a turbine impeller connected to a driven shaft, the pump impeller and the turbine impeller each having at least one ring of radial-admission blades, extending generally axially, the blade rings being coaxial, a turbine blade ring being of greater diameter than a pump blade ring, and the blade rings being arranged to rotate about a space serving for the supply of the fluid.

It is still another object of the present invention to provide a hydrodynamic torque transmission device which offers not only the possibility of considerably easier manufacture, but also the possibility of simple control.

With these and other objects in view, which will become apparent in the following detailed description, the present invention wil be clearly understood in connection with the accompanying drawings, in which:

FIG. 4 is an axial section of a fourth embodiment of the present invention jointly with an equalizer container;

FIG. 5 is a section along the lines 5—5 of FIG. 4;

FIG. 9 is an axial section of an equalizer container having a resilient wall; and FIG. 10 is an axial section of an equalizer container formed as a rubber bag.

Figure 1:
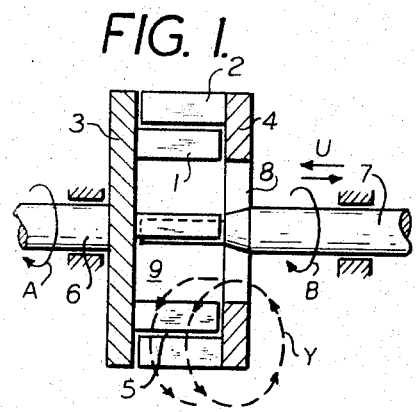
FIGURE 1 is an axial section of a first embodiment of the present invention.

Referring now to the drawings, in the embodiment shown in FIG. 1, a drive shaft 6 rotating in the direction of the arrow A, has a disc 3, which is equipped with a ring of radial-admission blades 1, extending axially. The pump blade ring is surrounded by a ring of turbine blades 2, which are mounted on a disc 5 fixed to a driven shaft 7. In the embodiment shown in FIG. 1, the pump blades 1 and also the turbine blades 2 have flat, radially extending flanks though this is not essential, as it is alternatively much more possible for the flanks to deviate from the radial plane and/or to be bent or curved, in each case in accordance with the operating conditions such as the rated input speed, the mid-diameter of the pump blade ring 1, the desired output speed, for instance. In the same way, the annular gap 5 located between the pump blade ring 1 and the turbine blade ring 2 can optionally have a greater or smaller radial width than shown, and can lie on a cylindrical surface of revolution as in the embodiment shown, or on a conical surface of revolution. Whereas the disc 3 of the pump impeller is a full circular disc, the disc 4 of the turbine impeller is an annular disc, which is connected with the driven shaft 7 by means of spokes 8. The spokes 8 can be constructed as axial-admission turbine blades. The driven shaft 7 is axially displaceable in the direction of the arrow U. The whole arrangement is located in a housing (not shown) which is filled with fluid, the housing surrounding the turbine blade ring 2 but at a considerable distance therefrom.

When the drive shaft 6 rotates in the direction of the arrow A at a suitably high speed, the pump blades 1 disposed around the central hollow space 9 centrifuge fluid outwardly and against the flanks of the turbine blades 2 as a result of the centrifugal effect of the fluid located in the central hollow space 9. The turbine blades 2 are carried along in the direction of rotation of the pump blades 1, by means of the impinging fluid, so that the driven shaft 7 rotates in the direction of the arrow B, i.e. in the same direction as the drive shaft 6 (see arrow A). The fluid flows outwardly from the turbine blades 2 and as a result of the pump effect mentioned above, fresh fluid is drawn in between the spokes 8 into the central hollow space 9. A part of the fluid located in the housing accordingly describes a path indicated by the arrows Y. This fluid circulation is about the transmission of the torque from the drive shaft 6 to the driven shaft 7. The torque, transmitted in this way to the driven shaft 7, is at a miximum when the axial overlap of the pump blades 1 and the turbine blades 2 is at its greatest, as shown in FIG. 1. If the driven shaft 7 is displaced in the direction of the lower arrow U, i.e. to the right of FIG. 1, the axial overlap of the blades 1 and 2 is reduced, thereby reducing the torque transmitted. Accordingly the axial displacement of the driven shaft 7, and, thereby, of the turbine blade ring 2, provides an additional possibility for "smooth" take-up, and "smooth" travel, if the device is installed for example in a motor vehicle.

Figure 2:
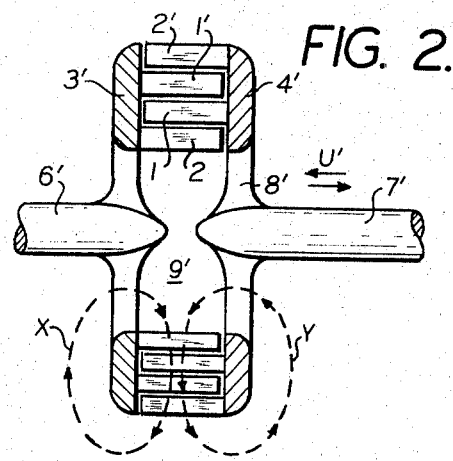
FIG. 2 is an axial section of a second embodiment of the present invention.

Referring now again to the drawing, and in particular to FIG. 2, the embodiment shown in this FIGURE differs from that of FIG. 1 in that both the pump impeller and the turbine impeller each have two rings of blades, 1 and 1' and 2 and 2', respectively, and that both discs 3' and 4' are constructed as annular discs and are connected by spokes 8' with their respective shafts 6' or 7'. The fluid accordingly can flow axially from both sides into the central hollow space 9', so that the flow of fluid follows path indicated by the arrows X, Y. Also with this embodiment, the degree of coupling can be altered by axial displacement of the driven shaft 7 in the direction indicated by the arrow U'.

Figure 3:
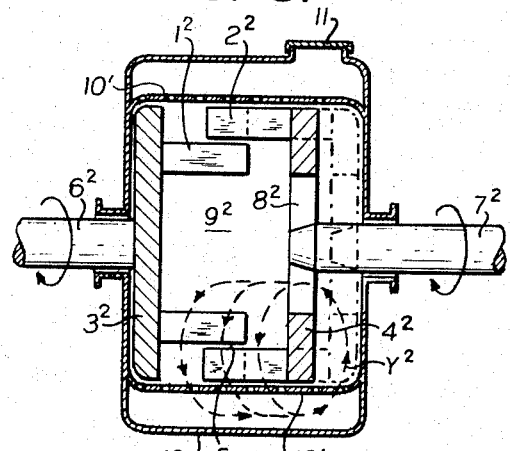
FIG. 3 is an axial section of a third embodiment of the present invention.

Referring now to the drawing and in particular to FIG. 3, the embodiment of this figure coresponds generally to that of FIG. 1, but the pump impeller and the turbine impeller are arranged in a housing 10 holding the fluid, the housing being closed by a lid 11. The housing 10 surrounds the turbine blade ring $2^2$ at a considerable distance therefrom, but it could also surround the turbine blade ring $2^2$ closely, as is indicated by the dotted line 10'. The turbine impeller connected to the driven shaft $7^2$ is axially displaceable for the purpose of regulating the hydrodynamic transmission of torque, and the spokes $8^2$ connected to the annular disc $4^2$ with the driven shaft $7^2$ are constructed as axial admission blades. With the maximum degree of axial overlap of the pump buckets 1 and the turbine blades $2^2$, the circulation of fluid indicated by the arrows $Y^2$ is not prevented, whereas with no axial overlap (shown in dotted lines), the annular disc $4^2$ and the spokes $8^2$ abut firmly against the right-hand end-wall of the housing 10, so that no fluid can flow axially between the spokes $8^2$ into the central hollow space $9^2$ and the fluid has to flow radially inwards between the turbine blades $2^2$, and accordingly no torque can be transmitted to the driven shaft $7^2$.

The embodiment of FIGS. 4 and 5 has a single ring pump impeller and the single ring turbine impeller disposed in a housing 10", which can be closed by means of a lid 11", the housing having a frusto-conical part increasing in diameter from the drive shaft 6" to the driven shaft 7". An equalising container 12 for the fluid is arranged on the housing 10". A chamber 13 of the equalising container 12 is connected with the interior of the housing 10" via openings 30. The pump impeller of the drive shaft 6" has a full disc 3" whose peripheral portion 16, carries a circular frictional covering 17 on the side facing away from the adjacent end wall of the housing 10". A hub 19, open at one end, extends from the central point of the disc 3" axially towards the interior of the housing 10", the hub 19 being intended to receive a pivot-like extension 21 of the driven shaft 7". The ring of pump blades 1" is located between the hub 19 and the periphery 16 of the disc 3" and the pump blades 1" extend axially into the housing 10" and are connected together at their inner ends by means of a seal-off ring 18. The turbine impeller has an annular disc 4" connected with the driven shaft 7" by means of spokes 8" constructed as axial-admission blades which disc 4" carries a ring of turbine blades 2" surrounding the pump impeller. The ends of the turbine blades 2" remote from the annular disc 4" are connected together by an annular disc whose peripheral portion 16' carries a circular friction covering 17' facing the covering 17. The drive shaft 6" and the driven shaft 7" run in ball bearings 14, 15, which are provided for example with Simmer rings to form a sure seal to prevent loss of fluid from the housing 10". By axial displacement of the turbine impeller connected with the driven shaft 7" in the direction indicated by the arrow U", the degree of overlap of the pump and turbine blades 1" and 2", and, thereby, the torque transmitted from the drive shaft 6" to the driven shaft 7" can be varied steplessly. With the maximum degree of overlap, the circular friction coverings 17 and 17' come into abutment with each other, the transmission of torque then occurring through a purely mechanical transmission of force by means of friction. The hollow chamber in the hub 19 is connected with the interior of the housing 10" by equalization bores 20, so that no air or liquid cushion can be formed by the piston effect of the extension 21, when the pump and turbine impeller move towards each other. As can be seen from FIG. 5, the flanks of the forwardly inclined pump blades 1" and the rearwardly inclined turbine blades 2" are flat, the blade angles being selected such that with a predetermined operational speed of the drive shaft 6", an exactly determined torque is transmitted to the driven shaft 7". The radial width of the annular gap 5" between the pump impeller and the turbine impeller is a function above all of the viscosity of the fluid located in the housing 10".

In the embodiment disclosed in FIG. 4, the degree of filling the housing 10" in increasing or decreasing same is continuously variable in such manner, that the housing 10" is in communication with an equalization container which is designed as a displacement cell. In the embodiment as shown, the equalization container 40 comprises a piston cell form of a cylinder 41a in which a piston 42 reciprocates. The connection of the inside of the housing and the inside of the cylinder 41a is obtained by means of a high pressure hose 43, which is secured to the housing 10" and to the cylinder 41a, respectively, by means of a clamp 44 or any other simple means. The piston 42 is displaceable towards the right by means of a hand lever 45 against the force of a spring 46, whereby it sucks liquid into the housing 10" and thereby reduces the degree of filling of the latter. By means of a locking (not shown) on the hand lever 45, the latter can be locked in a plurality of different positions and, thus, the degree of filling of the housing 10" can be set to predetermined values.

Figure 7:
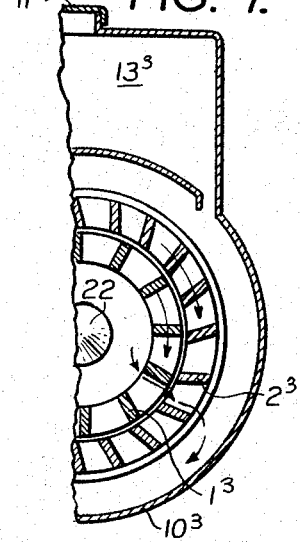
FIG. 7 is a section along the lines 7—7 of FIG. 6.
Figure 6:
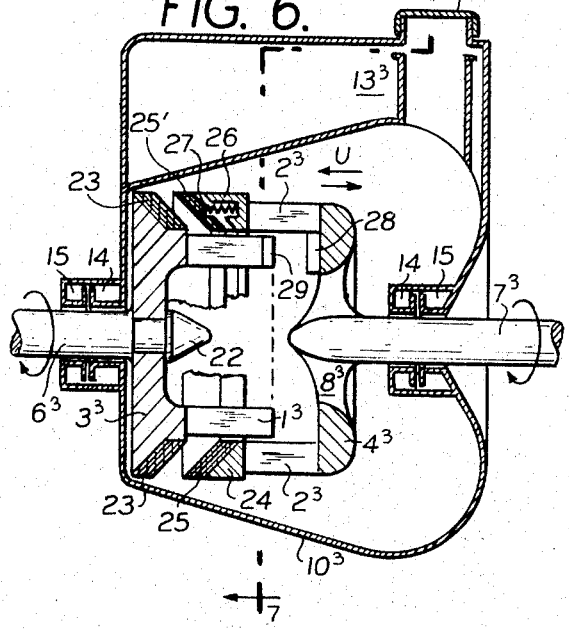
FIG. 6 is an axial section of a fifth embodiment of the present invention.

The embodiment shown in FIGS. 6 and 7 is mainly similar to that of FIGS. 4 and 5, but has a few important differences. For example, in the lower part of FIG. 6 the friction coverings 23 and 25 provided on the disc $3^3$ and on the annular disc 24, the latter disc 24 connecting together the ends of the turbine blades $2^3$ (which are remote from the disc $3^3$) are conical, and the free ends of the pump blades $1^3$ are not connected tobether by an annular disc. Furthermore, the drive shaft $6^3$, which in the embodiment shown is not integral with the disc $3^3$, has a conical shut-off piece 22 at its free end in the interior of the housing $10^3$.

As indicated in the upper part of FIG. 6, the friction covering 25 can be fixed on the annular disc 26 of the turbine impeller with interposition of axially acting springs 27, and the free ends of the pump blades $1^3$ and also the respective end faces of the annular disc $4^3$ can have coupling claws (or dogs) 28, 29. With this arrangement, on axial displacement of the turbine impeller with increasing degree of overlap, the friction coverings 23, 25 initially come into abutment and the friction force gradually increases as a result of the characteristic of the springs 27, so that the friction coupling acts as a synchronisation device for the claw (or dog) coupling 28 and 29, the coupling 28 and 29 only being effective with maximum overlap. Such synchronisation is particularly of advantage when the apparatus of the present invention is constructed as a multiple drive or is combined with such.

Although the pump blades 1³ and the turbine blades 2³ also have flat flanks in FIG. 7, this is not absolutely essential, and they could alternatively have bent or curved flanks, or even be bent or curved forwards or backwards.

Figure 8:
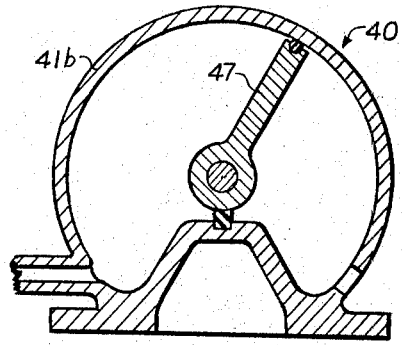
FIG. 8 is an equalizer container designed as a piston cell with rotary piston container.

FIG. 8 shows an equalization container 40' which comprises a piston cell 41b with a rotary piston 47 displaceably mounted thereon.

Referring now to FIG. 9 of the drawings, an equalization container 40² has a resilient wall 48 by which, upon pressing together the wall 48, the content of the equalization container 40² and, thereby, the filling degree of the housing 10" in communication therewith is variable. In FIG. 10 is disclosed finally an equalization 40³ which is designed as a rubber bag 49 mounted on the jacket 50, which is pressure-safe. The inside of the rubber bag 49 screwed or riveted to the jacket 50 at the point 51 is in communication with the inside of the housing 10" by means of a high pressure hose (not shown). If a pressurized gas or a pressurized liquid is fed into the chamber 52 of the jacket 50 not occupied by the rubber bag 49, the rubber bag 49 is compressed and a portion of the liquid disposed therein is pressed into the housing 10", the filling degree of which is thereby analogous during releasing of the pressure gas and of the pressure liquid, respectively, from the chamber 52, and a quantity of liquid present in the housing 10" is returned into the expanding rubber bag 49, whereby the filling degree of the housing is correspondingly reduced. The compression of the rubber bag 49 can be performed as a matter of course also purely mechanically, instead of by means of a pressure medium, as pressure gas or pressure liquid.

Quite generally, it is to be noted that the present invention is in no way to be restricted to the embodiments particularly described and shown; for example the turbine impeller could surround the pump impeller like a cage, with the drive shaft carried in the driven shaft, the driven shaft being constructed as a hollow shaft. A guide blade ring can be arranged between the pump blade ring and the turbine bucket ring and/or arranged around the latter, in order to take up the difference of the torque between the drive shaft and driven shaft and in order to guide the fluid into a desired or particularly advantageous direction. The outlet angle of the blades of at least one blade ring can be greater than 90°. Furthermore, instead of, or as well as, a friction coupling, a magnetic coupling, in particular an electro-magnetic coupling, could be provided. The blades of at least one blade ring could be displaceable, either manually or automatically, for example by means of centrifugal force, e.g. as a function of the speed of rotation of the drive shaft. The degree of filling of the housing could be alterable by means of the equalizing container in communication with the housing, either by constructing the equalizing container as a cylinder containing a displaceable piston, or by constructing the equalizing container as a piston compartment with rotary pistons; the equalizing container could also have resilient walls, and in particular it could be constructed as a bag of elastic material such as rubber. Furthermore, the apparatus of the invention could be constructed as gearing or combined with at least one gearing, i.e. friction wheel gearing or toothed wheel gearing, for instance spurwheel gearing, bevel gearing, worm gearing, or epicyclic gearing, i.e. as a sun-and-planet gear, to form for example a multi-speed or reversing drive. Finally, the relative axial displacement of the pump impeller and the turbine impeller could take place not only manually, but also mechanically for example pneumatically or hydraulically, or in particuar, electro-mechanically, or it could also be controlled automatically, in particular in conjunction with a program-controlled automatic mechanism.

While I have disclosed several embodiments of the present invention, it is to be understood that these embodiments ore given by example only and not in a limiting sense, the scope of the present invention being determined by the objects and claims.

I claim:
1. A hydro-dynamic torque transmission device comprising:
 a housing adapted to be at least partly filled with a fluid,
 a pump impeller disposed in said housing,
 a drive shaft extending into said housing and operatively connected to said pump impeller,
 a turbine impeller disposed in said housing,
 a driven shaft disposed coaxially with said driving shaft and extending into said housing, as well as operatively connected to said turbine impeller,
 said pump impeller and said turbine impeller each having at least one ring of radial-admission blades extending substantially axially,
 said blade rings being disposed coaxially relative to each other,
 said housing defining a central chamber and adapted to feed said fluid to said blades,
 said blade rings rotating about said central chamber,
 means for axially displacing said blade rings relative to each other into a plurality of radially overlapping positions, from an idle nonoverlapping position, with increasing overlapping, a synchronization position, and a coupling position,
 complementary coupling members secured to said blade rings, and resiliently yielding in axial direction to be rendered operative in said synchronization position of said blade rings, and
 coupling means secured to and operative between said blade rings in said coupling posiiton of said blade rings.
2. The device, as set forth in claim 1, wherein said coupling members comprise a friction coupling.
3. The device, as set forth in claim 1, wherein said coupling members comprise a magnetic coupling.
4. The device, as set forth in claim 1, wherein said coupling means comprises a claw coupling.
5. The device, as set forth in claim 1, wherein at least one of said blade rings is of annular shape, and spokes connecting said one of said blade rings with the corresponding of said shafts.
6. The device, as set forth in claim 5, wherein said spokes comprise axial blades.
7. The device, as set forth in claim 1, which includes setting means for the blades of at least one of said blade rings for changing the positions of said blades by turning about their axis.
8. The device, as set forth in claim 7, wherein said setting means comprises fly-wheel means autocatically setting the position of the blades of said pump impeller in response to the number of revolutions of said driving shaft.
9. The device, as set forth in claim 1, which includes an equalizing container formed as a displacement cell and communicating with said housing for varying the quantity of said fluid.
10. The device, as set forth in claim 9, wherein said equalizing container is formed as a container having a movable piston.
11. The device, as set forth in claim 9, wherein said equalizing container has at least one resilient wall, in order to vary the content of said equalizing container by compression of the latter.

12. The device, as set forth in claim 11, wherein said equalizing container comprises a bag of elastic material.

References Cited

UNITED STATES PATENTS

| | | | |
|---|---|---|---|
| 1,238,447 | 8/1917 | Severy | 192—58 |
| 1,551,055 | 8/1925 | Rieseler | 192—3.28 X |
| 2,577,057 | 12/1951 | White | 192—58 |
| 2,627,954 | 2/1953 | Lewis | 192—3.28 |
| 2,734,608 | 2/1956 | Longo | 192—58 X |
| 2,737,276 | 3/1956 | Wyndham | 192—58 |
| 2,845,157 | 7/1958 | Gambell | 192—58 X |

DONLEY J. STOCKING, *Primary Examiner.*

ARTHUR T. McKEON, *Examiner.*